UNITED STATES PATENT OFFICE.

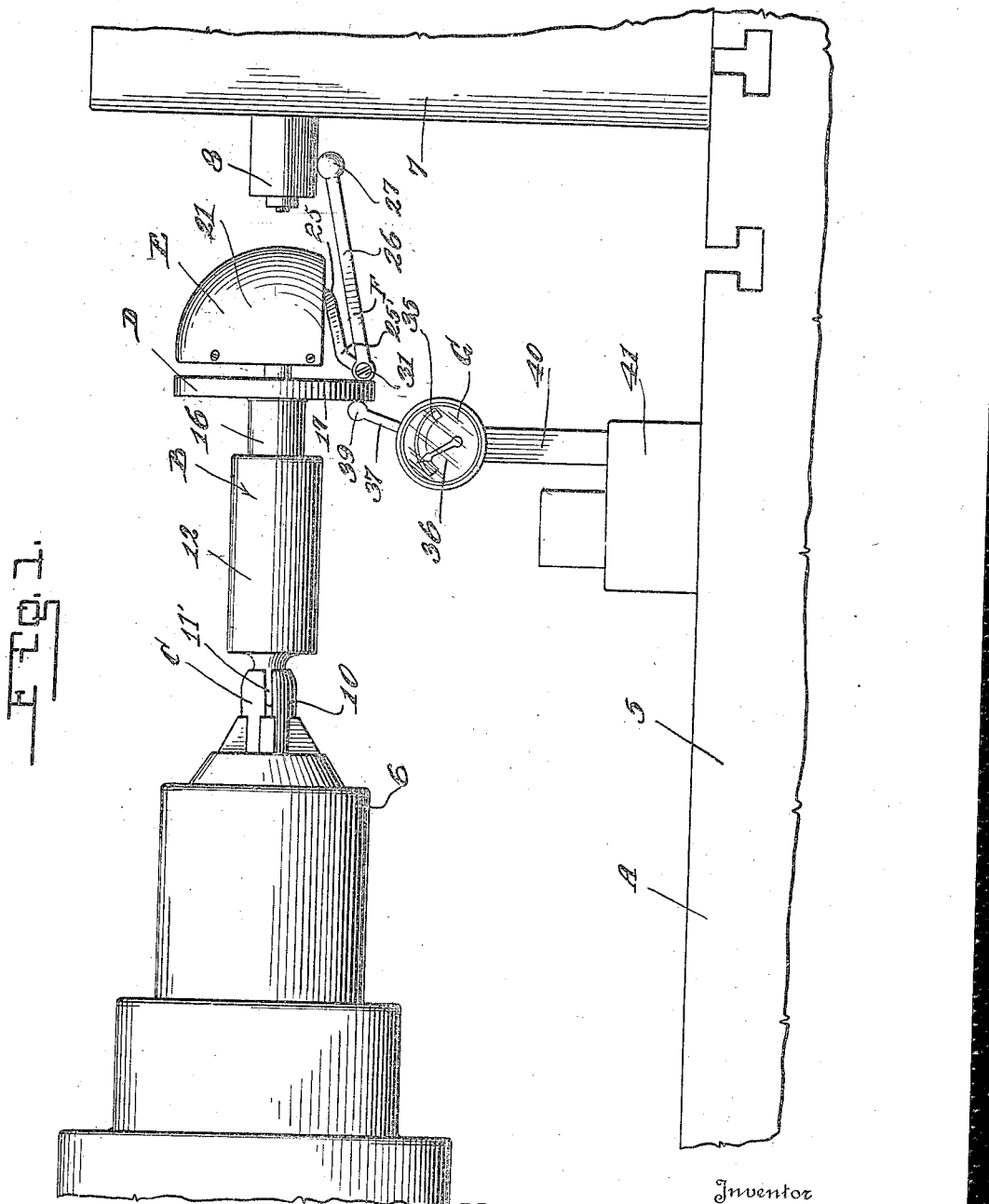

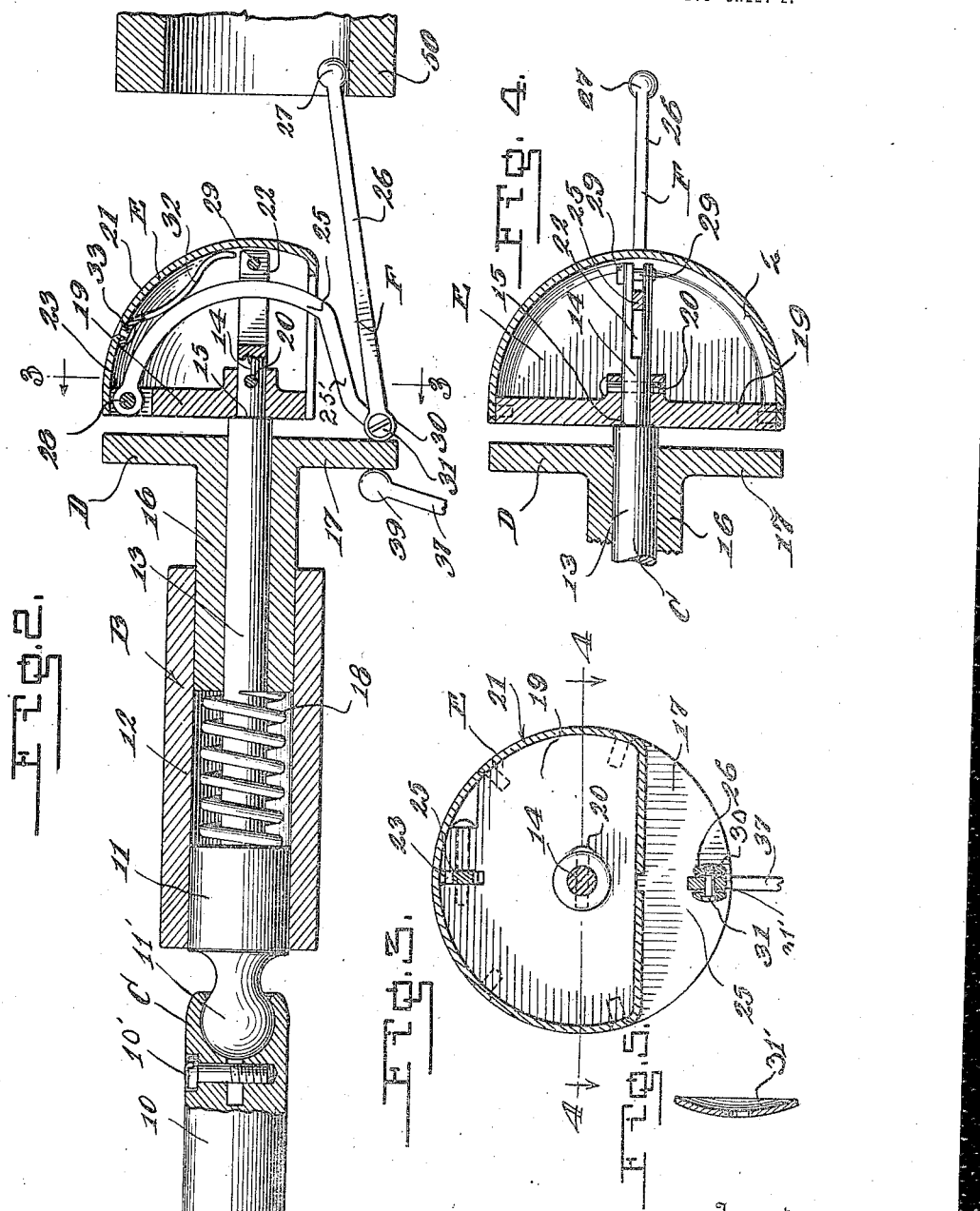

HENRY J. KREBS, OF DAYTON, OHIO.

INDICATOR.

1,424,310.

Specification of Letters Patent.　Patented Aug. 1, 1922.

Application filed January 7, 1921. Serial No. 435,686.

*To all whom it may concern:*

Be it known that I, HENRY J. KREBS, a citizen of the United States, residing at Dayton, in the county of Montgomery and State of Ohio, have invented certain new and useful Improvements in Indicators, of which the following is a specification.

This invention relates to attachments for metal working machines, such as milling machines, lathes and the like, and the primary object of the invention is to provide an improved indicator for centering the tool holding chuck and the work in relation to each other, which is so constructed, that the indicating gauge or dial is held stationary, so that the reading thereof can be instantly and easily ascertained, the improved indicating device eliminating the necessitating of attaching the indicating dial or gauge to the chuck, which renders the reading thereof impractical and difficult.

Another object of the invention is to provide a movable disc carried by the drill chuck, a spring pressed work engaging arm arranged to engage the disc, means for normally holding the disc and the arm in engagement with each other, and means for operatively connecting the disc to an ordinary type of indicator or dial.

A still further object of the invention is to provide an improved indicator for milling machines for either inside or outside work, which will be durable and efficient in use, one which will be simple and easy to manufacture, and one which can be placed upon the market at a reasonable cost.

With these and other objects in view, the invention consists in a novel construction, arrangement and formation of parts, as will be hereinafter more specifically described, claimed and illustrated in the accompanying drawings, forming a part of this specification, in which drawings:

Figure 1 is a side elevation of the improved indicating device, showing the same attached to a chuck of a milling machine, and in engagement with the work to be centered.

Figure 2 is a vertical longitudinal section through the improved indicator, showing the feeler or work engaging arm used for inside work.

Figure 3 is a detail transverse section taken on the line 3—3 of Figure 2.

Figure 4 is a detail horizontal section taken on the line 4—4 of Figure 3.

Figure 5 is a detail sectional view through one of the resilient washers utilized for frictionally holding the feeler arm against displacement on the operating arm.

Referring to the drawings in detail, wherein similar reference characters designate corresponding parts throughout the several views, the letter A indicates a milling machine, and B, the improved indicator for use in connection therewith.

While the improved indicator has been shown used in connection with a milling machine, it is to be understood that the same can be used for other types of metal working machines if so desired. The milling machine A may be of the usual or any preferred type, and includes the bed 5, the tool chuck 6, which is mounted for movement toward or away from the work or work support designated by the numeral 7. As shown in Figure 1 of the drawings, the work or work support has connected thereto in any preferred manner the outwardly extending button 8, which is adapted to be centered in relation to the chuck 6.

The improved indicator B comprises the chuck engaging portion C, the operating disc and cooperating parts D, the head E, the disc operating portion F, and the dial or indicating portion G.

The chuck engaging portion C comprises a cylindrical shank 10, which is adapted to be inserted directly into the chuck 6 and clamped therein in the usual manner. The forward end of the cylindrical shank 10 has connected thereto by means of a ball and socket joint or the like 11' and arm 11, which has pressed thereon a forwardly extending cylindrical sleeve 12, which slidably supports the disc operating member D, which will be hereinafter more specifically described. In order to hold the arm 11 against accidental displacement of the shank 10, an adjusting screw 10' is provided for the socket. The forward end of the arm 11 has a reduced forwardly extending stem 13 formed thereon, and this stem extends beyond the sleeve 12. The extreme outer end of the reduced stem has a reduced extension 14 formed thereon which defines a limiting shoulder 15. The reduced extension 14 carries the head E which also will be hereinafter more specifically described. The operating disc member D includes the hollow cylindrical body 16 which is slidably mounted upon the stem 13, and in the bore of the sleeve 12. The forward end of the hollow body 16 has formed thereon an outwardly extending annular flange 17, which forms the operating disc for the indicator which will also be herinafter more specifically described. The operating disc member D is normally urged outwardly upon the stem 13 by means of a helical spring 18, which is coiled around the stem 13 and bears against the forward end of the cylindrical shank portion 10 and the body portion 16 of the operating disc member D.

The head E includes the plate 19 which is mounted upon the reduced extension 14 of the stem 13 and bears against the shoulder 15 defined by the said extension. The plate 19 is held against displacement by means of a fastening element 20. This plate 19 supports a hollow casing of substantially semispherical form, and this casing 21 partially houses the operating portion F for the disc portion D, which will be hereinafter more specifically described. The extreme forward end of the reduced extension 14 of the stem 13 is provided with a longitudinally extending slot 22, which is in the same plane with a slot 23 formed in one edge of the plate 19.

The operating means F for the disc portion D includes an arcuate substantially semi-circular arm 25, and a work feeling lever 26, which has formed on its outer end the work engaging head or ball 27. The inner end of the arcuate arm 25 extends into the housing 21 and has its inner end pivotally secured upon a pin 28, carried by the walls of the slotted portion 23 of the disc 19. The inner end of the arcuate arm 25 is fitted into the slotted portion as clearly shown in the drawings. The intermediate portion of the arcuate arm 25 slidably extends through the slotted end 22 of the reduced extension 14 of the stem 13 and the movement thereof is limited in the slot by means of a pin 29. The outer end of the arcuate arm 25 is provided with an angularly extending arm 25'. The inner end of the arm 26 terminates in a circular bifurcated head 30 which normally rests against the outer surface of the disc 17. The outer end of the arm 25 is positioned in the bifurcation of the inner end of the feeler arm 26 and is connected thereto for synchronous movement by means of a screw 31. Suitable concavo-convex resilient washers 31' are interposed between the head 30 and the outer end of the arm 25 which prevent accidental slipping between the arms. The screw 31 permits the arm 26 to be moved or adjusted in relation thereto, and in accordance with the character of the work being acted upon.

In order to normally hold the head 30 in engagement with the outer surface of the disc portion D, a leaf spring 32 is secured to the inner face of the casing 21 by means of a rivet or the like 33, and this spring engages the arm 25 and urges the same toward the disc.

The gauge G for indicating the fluctuations of the arm 26, if any, is of the usual or any preferred form, used by machinists, and includes the graduated dial plate or face 35, and the indicating pointer 36, which is operatively connected in the usual manner to the operating arm 37, which is provided with a spherical head 39, which is adapted to engage the inner face of the disc 17 of the disc portion D. The indicator is mounted upon a suitable standard which is carried by a base 41 which may be removably secured or held in place against movement in any preferred manner on the bed 5 of the milling machine A. The spherical or ball head 27 of the operating arm 26 is adapted to be used in connection with either inside or outside work, as clearly shown in Figures 1 and 2 of the drawings. In view of the fact that the gauge is non-rotatably associated with the bed 5, the easy reading thereof is permitted.

In operation of the improved tool, when it is desired to center or indicate the position of the button 8 in relation to the tool chuck 6, the arm 26 is swung on the screw 31 as a pivot until the ball or spherical head 27 comes into engagement with the outer surface of the button and the spring 18 tends to hold the ball head 27 in engagement with the button. After the head is adjusted the arm 26 will move synchronously with the arm 25, owing to the resilient washers 31'. It can be seen that any variance in the contour of the button 8 will swing the arm 25, which in turn will press against the outer surface of the disc 17 of the disc operating portion D, and the disc in turn will operate the operating arm 37 of the indicator G which will move the pointer 36 back and forth over the dial plate 35. Thus it can be seen that the machinist can at once determine the arrangement of the button to the work and to the chuck, so that he can adjust or operate upon the button accordingly.

When the bore of a piece of work indicated by the numeral 50 in Figure 2 of the drawings is to be acted upon, the head 27 is moved into engagement with the inner surface of the work or the bore thereof until the spring 32 will normally hold the same in engagement therewith. The chuck is slowly rotated, which will move the spherical head around the inner surface of the work, and any variance thereof will be indicated by the pointer 36 as hereinbefore described.

The ball socket joint 11' permits the aligning of the indicator with the body portion of the chuck if the jaws of the chuck have been damaged and forced out of alignment.

From the foregoing description, it can be seen that an improved indicator has been provided for milling machines, in which any variation of the contour of the work, or relation thereof to the chuck can be accurately and instantly determined in an easy and convenient manner by the machinist.

Changes in details may be made without departing from the spirit or scope of this invention; but,

I claim:

1. The combination with a metal working machine including a bed, a chuck, and a work holder, of an indicator for the work and chuck including a gauge carried by the bed, and operating and work engaging arms operatively connected together and carried by the chuck for engaging the work, and means carried by the chuck and actuated by said arms for operating the gauge.

2. The combination with a metal working machine including a bed, a chuck, and a work holder, of an indicator for the work and chuck including a gauge arranged on the bed, a disc slidably carried by the chuck for rotation therewith, an operating and work engaging lever swingably carried by the chuck for rotation therewith, and arranged to engage the disc, the gauge including an operating arm, the arm being in frictional engagement with the said disc.

3. The combination with a metal working machine including a bed, a chuck, and a work holder, of an indicator for the work and chuck including a gauge arranged on the bed and including a dial, an indicating pointer movable over the dial, and an operating arm for said pointer, a sliding disc carried by the chuck and arranged for rotation therewith, a head rigidly carried by the chuck, an operating arm pivotally secured to the head, and arranged to frictionally engage said disc, a forwardly extending work engaging arm adjustably carried by said operating arm in engagement with one face of the disc, and means for holding the gauge operating arm into engagement with the opposite face of the disc.

4. The combination with a metal working machine including a bed, a chuck, and a work holder, of an indicator for the work and chuck including a non-rotatable gauge removably arranged on the bed having a dial, an indicating pointer movable over the dial and an operating arm for the pointer, a shank carried by the chuck, a spring pressured disc slidably carried by the shank for rotation therein, a rigid head carried by the chuck, an arcuate arm secured to the head, spring means normally urging one end of the arcuate arm into engagement with one face of the disc, a work engaging arm, means for adjustably securing the work engaging arm to the arcuate operating arm, and a work engaging head formed on the outer end of said work engaging arm, the operating arm for the gauge being in engagement with the face of the disc opposite to the face of the disc engaged by said arcuate arm.

5. The combination with a milling machine including a bed, a chuck, and a work holder, of an indicator for the work and chuck including a shank for insertion into the chuck, a stem formed on the shank, a sleeve slidably mounted on the stem, a disc formed on the sleeve, spring means for normally urging the sleeve outwardly upon the stem, a head rigidly carried by the stem, an operating arm, means pivotally securing the inner end of the operating arm to the head, spring means normally urging the opposite end of the arm into engagement with one face of the disc, a work engaging arm, means adjustably securing the inner end of the work engaging arm to the operating arm, a spherical work engaging head formed on the outer end of said arm, and a gauge removably arranged on the bed including a dial, a pointer movable over the dial, and an operating arm for the pointer arranged to engage the inner face of the disc.

6. An indicator for metal working machines comprising a shank, a reduced stem formed on the shank, a spherical casing carried by the shank, a sleeve slidably mounted on the stem, a disc formed upon the sleeve, a spring coiled around said stem and engaging said sleeve and shank, a head rigidly secured to the outer end of said stem, a casing carried by the head, an arcuate arm, means pivotally securing the inner end of said arcuate arm to said head, spring means normally urging the opposite end of the arcuate arm into engagement with the outer face of the disc, a forwardly extending work engaging arm, a spherical head formed on the outer end of said arm, means connecting the inner ends of said arm to the outer ends of said arcuate arm, a gauge, and means operatively connecting the gauge to said disc.

7. An indicator for metal working machines comprising a shank, a reduced stem formed on the shank, a reduced extension formed on said stem having a longitudinally extending slot formed therein, a cylindrical casing carried by the outer end of said shank, a sleeve slidably mounted upon said stem and received in said casing, a disc formed upon said sleeve, a spring coiled around said stem and engaging said shank and sleeve, a head carried by the reduced extension of the stem, a casing secured to said head, the outer edge of the head being slotted, a substantially semi-circular arm in engagement with the outer face of said disc, a forwardly extending arm, means hingedly securing the inner end of said arm to the outer end of said arcuate arm, a spherical head formed on the outer end of said arm, a gauge including a dial, a pointer movable over the dial, and an operating arm for the pointer arranged to engage the inner surface of said disc.

8. The combination with a metal working machine including a chuck, and a work holder, of an indicator for the work and chuck including a gauge, a shank adapted to be clamped in the chuck, an operating and work engaging arm, a ball and socket joint for connecting the operating and work engaging arm to the shank, and means for operating the gauge from the operating and work engaging arm.

9. The combination with a metal working machine including a bed, a chuck, and a work holder, of an indicator for the work and chuck including a gauge removably arranged on the bed, a shank adapted to be detachably secured to the chuck, a forwardly extending arm, a ball and socket joint connecting the arm and the shank together, and operating and work engaging arms carried by the first mentioned arm for engaging the work, and means actuated by said arms for operating the gauge.

HENRY J. KREBS.